Patented Mar. 4, 1941

2,233,429

UNITED STATES PATENT OFFICE 2,233,429

METHOD OF PRODUCING BETA-TETRA-CHLOR-KETONAPHTHALENE

Iwan I. Ostromislensky, New York, N. Y., assignor, by direct and mesne assignments, of one-half to M. W. Openchowski, Newark, N. J., and one-half to Gordon Brown Scheibell, Millburn, N. J.; William O. Scheibell, administrator of said Gordon Brown Scheibell, deceased No Drawing. Original application April 23, 1936, Serial No. 76,009. Divided and this application September 21, 1937, Serial No. 164,906

4 Claims. (Cl. 260—590)

My invention relates to phototropic substances and specifically relates to the production of a phototropic substance, this being a divisional of my application, Serial No. 76,009, filed April 23, 1936.

The object of my invention is to provide a film comprising in its composition phototropic substances, i. e., substances which darken under action of light, but lose their coloration after being kept for a certain length of time in a dark place. Such phototropic films, therefore, can be used for obtaining negatives by exposing them in photographic cameras, the images appearing without development. These images last for a sufficiently long time so that positive prints can be made from them on a photosensitive paper. The film can then be restored to its original transparent condition by keeping it for some time in a dark place, and then it can be used again for taking pictures.

I have found that satisfactory renewable films can be prepared with the beta modification of tetrachlor-ketonaphthalene.

Another object of my invention is to provide a method for producing beta-tetrachlor-ketonaphthalene in a pure state and with sufficient yield to render the process commercially practical and inexpensive.

Another object of my invention is to provide a photographic film having in its composition a fluorescent substance in order to enhance the action of light on the photosensitive material of the film, also to prolong the action of light.

Still another object of my invention is to provide a photographic film with an increased phototropic action of a phototropic substance with which the film is made, by the use of a homogeneous emulsion of the substance in a transparent plastic material, preferably styrol glass.

Up to the present time no method was known for producing the beta modification of tetrachlor-ketonaphthalene on a practical or commercial scale. Zinke has prepared this substance by subjecting a solution of trichlor-alpha-naphthalene to the action of a stream of chlorine, also by splitting one molecule of hydrochloric acid from pentachlor-alpha-ketonaphthalene with the aid of a caustic alkali. Neither of these methods is practical, however, as the yield of the phototropic substance is quite negligible. The second method has also an added disadvantage, in that both, beta and alpha modifications are obtained, the latter lacking entirely photographic properties.

I have discovered that it is possible to prepare pure beta modification alone and with a satisfactory yield, by subjecting pentachlor-alpha-ketonaphthalene to the action of an amine. The reaction takes several minutes, the yield reaching 64% of the theory.

*Example.*—30 gms. of pentachlor-ketonaphthalene is dissolved in 540 cc. of boiling 95% alcohol. To this solution, after rapid filtration and while it is still hot, 7.5 gms. of pyridine is added. The mixture is vigorously stirred for 5–10 minutes and placed in an ice bath for 1–2 hours. Pure beta-tetrachlor-ketonaphthalene rapidly settles from the mixture in the form of a mass of almost colorless small prismatic crystals. They are separated on a Buechner funnel, pressed, washed with a small quantity of ethyl alcohol previously cooled on ice, then pressed again in vacuo over sulfuric acid in a desiccator. This substance melts in the capillary tube at 115–116° F.

The crystals are then used for the preparation of an emulsion by ordinary methods, the emulsion being used for making films.

The film may be prepared with a suitable transparent, colorless plastic organic colloidal substance, such as acetyl cellulose, nitro cellulose, gelatin, etc. The substance is mixed with the colloid in the form of a suspension, as homogeneous as it is possible to obtain. I have also found that the phototropic properties of the substance are markedly increased if for the preparation of the film are used certain modifications of styrol glass, particularly meta styrol, as described in my Patents Nos. 1,541,176, 1,541,175, 1,552,874, 1,552,875, 1,613,673, and 1,675,281.

Beta-tetrachlor-ketonaphthalene is colorless, but it acquires a deep violet color when subjected to the action of ultra violet rays. This effect is particularly noticeable when the substance is suspended in the foregoing plastics and made into a film, separately used or placed on a glass plate, for taking pictures in photographic cameras. Such a film, when exposed in a camera, registers a negative image, visible without any further development. This negative can be used for making positive prints on an ordinary photosensitive paper, preferably prepared with a silver halide, such as silver bromide. In order to prevent veiling of the negative and print by the action of light on beta-tetrachlor-ketonaphthalene, it is advisable to print in the light of such wave length which does not appreciably affect the phototropic substance but acts on silver halides. Green light is especially suitable for this purpose.

When the printing operation is completed, the film may be renewed by placing it in complete darkness for about 12 hours at the room temperature. The film then becomes colorless, all traces of the image disappearing, and can be used again for taking pictures in a camera.

The process or renewal or discoloration of the film is accelerated at higher temperatures, and at 80° C. takes place almost instantaneously.

The word "phototropic" as herein used defines an action of change of color or density of a substance under the influence of radiation without an attendant appreciable change of identity of the substance, and/or of a reversible nature so that the substance is restorable to an original condition subject to further change of color or density under the influence of radiation.

It is understood that other phototropic substances may be used in the preparation of my renewable films. The action of light on the phototropic substance on the film may be considerably enhanced by adding to the emulsion of the film a suitable phosphorescent substance, such as blue or violet calcium sulfide containing traces of various metals. The addition of a phosphorescent substance not only increases the intensity of the action of light, but also prolongs its action, so that very short exposures can be made under such lighting conditions that would otherwise require much longer exposure.

What is claimed as new and original and desired to be secured by Letters Patent of the United States is:

1. A method of producing beta-tetrachlor-ketonaphthalene, consisting in dissolving pentachlor-alpha-ketonaphthalene in boiling alcohol with an amine, separating the product, washing and drying.

2. A method of producing beta-tetrachlor-ketonaphthalene, consisting in dissolving pentachlor-alpha-ketonaphthalene in boiling alcohol with pyridine, separating the product, washing and drying.

3. A step in the process of preparation of beta-tetrachlor-ketonaphthalene, consisting in dissolving pentachlor-alpha-ketonaphthalene with an amine.

4. A method of producing beta-tetrachlor-ketonaphthalene consisting in dissolving pentachlor-ketonaphthalene in boiling alcohol and reacting the hot solution with pyridine.

IWAN I. OSTROMISLENSKY.